C. B. GLADDING.
TRACTION WHEEL.
APPLICATION FILED JUNE 8, 1914.
1,121,243.
Patented Dec. 15, 1914.
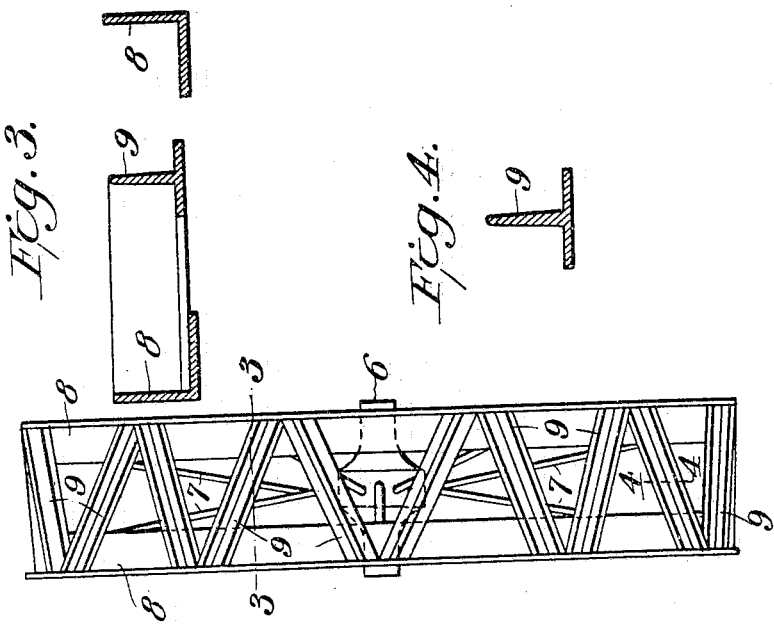
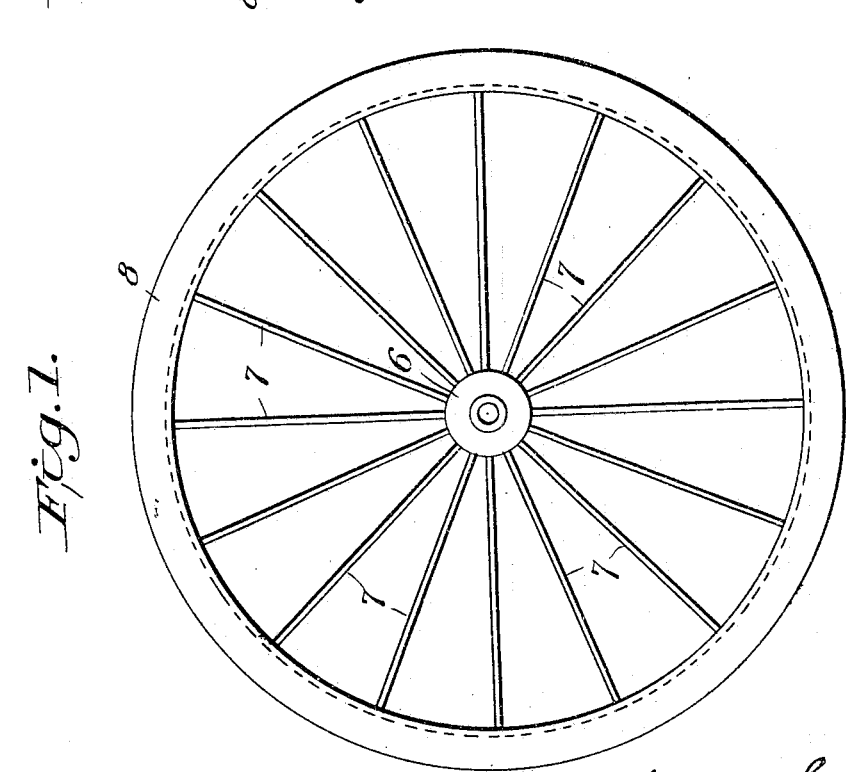
Witnesses
C. N. Walker.
M. Rogers
Inventor
Charles B. Gladding
by John A. Bonnhardt
Attorney

UNITED STATES PATENT OFFICE.

CHARLES B. GLADDING, OF GENEVA, OHIO.

TRACTION-WHEEL.

1,121,243.

Specification of Letters Patent.

Patented Dec. 15, 1914.

Application filed June 8, 1914. Serial No. 843,843.

*To all whom it may concern:*

Be it known that I, CHARLES B. GLADDING, citizen of the United States, residing at Geneva, in the county of Ashtabula and State of Ohio, have invented certain new and useful Improvements in Traction-Wheels, of which the following is a specification.

This invention relates to traction wheels, particularly adapted for use on traction engines or other motor vehicles, especially heavy vehicles employed for hauling or agricultural purposes.

The object of the invention is to form an improved traction wheel which will run smoothly on hard ground or a pavement; which will not skid sidewise, or slip without grip; which will not pack the ground when working on plowed fields; which will not make a deep track or cut into the road; which can be made very light and of cheap material, and which will have powerful traction without heavy weight.

The invention is illustrated in the accompanying drawings in which:—

Figure 1 is a side view of the wheel. Fig. 2 is an edge view. Fig. 3 is a section on the line 3—3, and Fig. 4 is a section on the line 4—4 of Fig. 2.

Referring specifically to the drawings, 6 indicates a hub, cast on the inner end of metal spokes 7, the outer ends of which are fastened to the rim. This rim comprises two rings 8 of angle-iron, one flange of which projects radially outwardly and the other flange of which projects laterally inwardly. The spokes diverge from the hub, with respect to each other and are alternately fastened to the respective rings. Cross pieces 9 extend between the rings, and these cross pieces preferably consist of T-irons extending at an angle or diagonally. The stems or middle flanges of the T-irons are substantially flush with the outer edges of the outer flanges of the rings 8. The head or side flanges of the T-irons are bolted or otherwise secured to the inner flanges of the rings 8, and serve to space said rings apart, to hold them in proper position, and to form a light and rigid rim structure therewith. The T bars are arranged at alternate opposite angles to give a grip both ways against lateral skidding.

On hard ground, the wheel will run on the edges of the side rings and the cross bars, said edges forming a continuous line of contact with the ground so that the wheel will travel without bumping. On soft ground the flanges cut in to give a grip which prevents skidding or slipping under traction, and the openings between the cross bars allow soft ground to pass, so that it is not packed, and the wheel is therefore without objection in operation on plowed ground. It may be constructed of stock material, with obvious advantages with respect to cheapness and lightness.

What I claim as new is:—

A traction wheel the rim of which consists of two side rings of angle metal, one flange of each of which is presented outwardly, and the inner flanges of which extend toward each other, and cross bars of angle metal extending between said rings, the cross bars having flanges extending outwardly and having longitudinal side flanges which rest upon and are secured to the inner flanges of the side rings.

In testimony whereof, I affix my signature in presence of two witnesses.

CHARLES B. GLADDING.

Witnesses:
CHAS. F. FORD,
A. S. BARNES.

Copies of this patent may be obtained for five cents each, by addressing the "Commissioner of Patents, Washington, D. C."